Patented Nov. 13, 1934

1,980,896

UNITED STATES PATENT OFFICE 1,980,896

PROCESS OF CLARIFYING CHLORINATED SOLUTIONS

Clifton N. Windecker, Painesville, Ohio

No Drawing. Application July 7, 1932,
Serial No. 621,312

4 Claims. (Cl. 210—2)

When chlorine is used to form and sterilize sludges and putrid matter in sewage or other wastes, and these sludges are removed, a fine cloud remains in the main sewage effluent. It will not settle and cannot be coagulated or filtered by known methods without great expense.

The object of this invention is to coagulate and render this cloud either settable or filterable. To do this cheaply and efficiently, I have discovered that a flocculent precipitate must be produced to properly coagulate this cloud. This flocculent precipitate may be formed by precipitating the calcium bicarbonate, calcium sulphate, and magnesium compounds found in all natural waters to a varying degree. There are many chemicals which will precipitate these minerals, among which are the hydroxides of sodium, potassium, magnesium, calcium, barium, etc., the cheapest of which is calcium hydroxide, and this I prefer to use, although a combination of two or more of them, including calcium hydroxide, may be employed.

The use of calcium hydroxide or lime is not new for removing temporary hardness from natural waters, but in removing the cloud formed by chlorinating sewage a condition exists which differs from that found in treating natural waters to remove temporary hardness. This condition is produced by the action of chlorine on the various substances in sewage, resulting in the production of acids and acid products.

These acids and acid products, together with any desired amount of free chlorine, must be neutralized before any flocculent precipitate can be formed. In carrying out the present invention, sufficient lime or equivalent material is added to the cloudy chlorinated effluent to neutralize the free or available chlorine and the acids and acid products referred to, together with enough lime to throw down and precipitate enough flocculent material to coagulate the fine cloud and render it settable or filterable to any desired clarity. The best results are obtained when the maximum amount of precipitation is formed. If the natural waters are so pure as not to furnish the proper amount of flocculating material, additions may be made of such materials as will produce a sufficient floc, such as alum, ferric chloride, or other well known coagulants.

This invention will be of special advantage in connection with an invention described in application for Letters Patent of the United States Serial No. 611,549, filed May 16, 1932 in the name of Charles E. Lyon. The Lyon invention uses the proper amount of chlorine to chlorinate a concentrated sludge which, when recirculated and added to the raw sewage, acts as a coagulating and sterilizing medium to remove all settable solid products. The action of chlorine in this process produces a finely dispersed sterilized cloud which can be, with safety to health, carried into any stream or body of water if clarity of discharge is not necessary. When clarity of discharge is required, this invention produces conditions that will render the cloud settable or filterable to any desired clarity. I do not wish to limit myself, however, to the use of this invention in connection with the Lyon process but intend its use with other sewage treatment in which chlorine is used.

Should it be desired to use a lesser amount of chlorine in the treatment of sludges than will be required to completely sterilize the sewage effluent, further chlorine may be added after clarity has been obtained by this process without producing a cloudy effect.

In localities where household wastes and varying composition of trade wastes, such as pickling acid wastes, etc., are present at various times, very simple chemical tests can be made by which the amounts of lime or other necessary reagents can be determined to accomplish the desired results.

The treatment of the cloudy chlorinated solution with lime, together with one or more of the other reagents mentioned, is preferably carried out in an agitating tank after the sewage has been treated with chlorine and the heavy sludges removed. In some instances, however, the chlorination of the sewage and the treatment with lime may be effected simultaneously or substantially so, but in most instances the two treatments are carried out separately, especially as the agitation necessary for chlorination and removal of the heavier sludges may disturb the flocculent character of the precipitate necessary for complete clarification.

Having thus described my invention, I claim:

1. The process of sewage disposal, which comprises treating sewage with chlorine and removing solids, and subsequently treating the separated effluent by neutralizing acid products therein and producing a flocculent precipitate entraining finely divided suspended particles.

2. The process of sewage disposal, which comprises treating sewage with chlorine and removing solids, and subsequently treating the cloudy effluent produced by the chlorinated products with calcium hydroxide in amount to neutralize acid and producing a flocculent precipitate entraining finely divided suspended particles.

3. The process of sewage disposal which comprises treating sewage sludges with chlorine, introducing the chlorinated sludges into raw sewage thereby removing the heavy sludges by settlement, and treating the effluent with one or more substances which neutralize the acids and acid products produced by the chlorination step and throw down a flocculent precipitate to coagulate the finely divided particles in suspension.

4. The process of sewage disposal which comprises treating sewage sludges with chlorine, introducing the chlorinated sludges into the raw sewage thereby removing the heavy sludges by settlement, and treating the effluent with calcium hydroxide to an amount sufficient to neutralize acids and acid products produced in the chlorination process and to produce a flocculent precipitate of calcium and magnesium compounds.

CLIFTON N. WINDECKER.